United States Patent
Han-Dressor et al.

(10) Patent No.: US 7,367,621 B1
(45) Date of Patent: May 6, 2008

(54) DISPOSABLE SHOPPING CART CHILD SEAT LINER

(76) Inventors: Joannie U. Han-Dressor, 6822 Morella Ave. #G, North Hollywood, CA (US) 91605; Eric A. Dressor, 6822 Morella Ave. #G, North Hollywood, CA (US) 91605

(*) Notice: Subject to any disclaimer, the term of this patent is extended or adjusted under 35 U.S.C. 154(b) by 0 days.

(21) Appl. No.: 11/433,855

(22) Filed: May 15, 2006

(51) Int. Cl.
*A47D 1/10* (2006.01)

(52) U.S. Cl. .............................. 297/256.17; 297/219.12

(58) Field of Classification Search ........... 297/256.17, 297/219.12
See application file for complete search history.

(56) References Cited

U.S. PATENT DOCUMENTS

| | | | |
|---|---|---|---|
| 4,805,937 A | 2/1989 | Boucher et al. | |
| 4,883,701 A * | 11/1989 | Rankin et al. | 297/219.12 X |
| 4,885,200 A * | 12/1989 | Perdelwitz et al. | 297/219.12 X |
| 4,891,454 A * | 1/1990 | Perdelwitz et al. | 297/219.12 X |
| 4,892,769 A * | 1/1990 | Perdelwitz et al. | 297/219.12 |
| 5,004,252 A | 4/1991 | Kraper | |
| 5,425,546 A | 6/1995 | Gerber et al. | |
| 5,678,888 A | 10/1997 | Sowell et al. | |
| 6,428,098 B1 * | 8/2002 | Allbaugh | 297/219.12 |
| 6,491,996 B2 * | 12/2002 | Digangi | 297/256.17 X |
| 6,517,155 B1 * | 2/2003 | Landine | 297/256.17 |
| 6,655,734 B2 * | 12/2003 | Hunter et al. | 297/219.12 X |
| 6,929,326 B2 * | 8/2005 | Cohen-Fyffe | 297/219.12 |
| 6,959,963 B2 * | 11/2005 | Hunter et al. | 297/219.12 |
| 6,981,707 B1 | 1/2006 | Dandy | |
| 2001/0048235 A1 * | 12/2001 | Hartranft | 297/219.12 |

* cited by examiner

*Primary Examiner*—Rodney B. White
(74) *Attorney, Agent, or Firm*—Albert O. Cota

(57) ABSTRACT

A disposable seat liner (10) that covers a shopping cart's child seat (20) that includes a cart handle (22). The liner (10) consists of a liner seat bottom (24) configured to cover the child's seating area of a shopping cart (26). A liner right side (28) and a liner left side (30) are integrally formed with the seat bottom and folded upward. A liner handle end (32) overlaps the cart handle (22) and is also integrally formed with the liner seat bottom (24). A liner seat back (42) jointly overlaps the cart's seat and the cart's basket upper portion, and is permanently attached with heat-sealed joints (34) to the liner right side and left side on adjacent edges, thereby forming a disposable protective cover to assure isolation from microorganisms found on the shopping cart's child seat and handle.

13 Claims, 4 Drawing Sheets

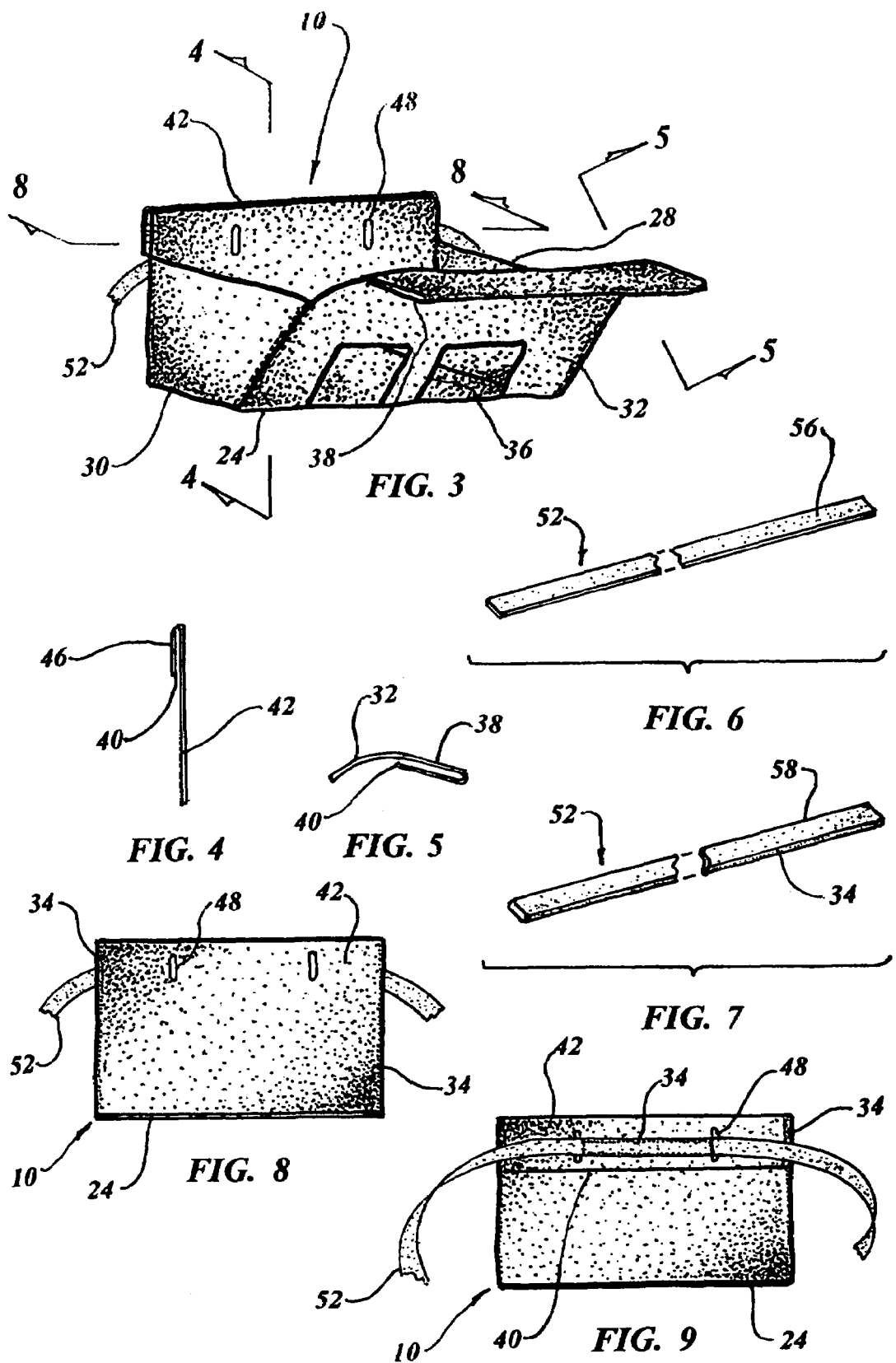

DISPOSABLE SHOPPING CART CHILD SEAT LINER

TECHNICAL FIELD

The invention generally pertains to health protection for shopping carts, and more specifically to a shopping cart child seat liner that is disposable, thereby isolating a child and guarding the child from microorganisms that can be retained on a shopping cart's seat and handles from prior use.

BACKGROUND ART

Previously, many types of seat and handle covers have been used to provide an effective means for protecting a child seated in a shopping cart from health hazards.

The prior art listed below did not disclose any patents that possess the novelty of the instant invention, however the following U.S. patents are considered related:

| U.S. Pat. No. | Inventor | Issue Date |
| --- | --- | --- |
| 4,805,937 | Boucher et al. | Feb. 21, 1989 |
| 5,004,242 | Kraper | Apr. 2, 1991 |
| 5,425,546 | Gerber et al. | Jun. 20, 1995 |
| 5,678,888 | Sowell et al. | Oct. 21, 1997 |

Boucher et al. in U.S. Pat. No. 4,805,937 teaches a shopping cart handle cover that is formed from a padded fabric strip. Hook and loop fasteners secure the strip around the handle of a shopping cart. The cover provides protection to children and includes toys that are secured to the cover for the amusement of a child.

U.S. Pat. No. 5,004,242 issued to Kraper is for a shopping basket in the form of a partition for covering the bin area of a shopping cart. The partition is mounted on the carts vertical divider for providing a solid writing surface and may be lifted and rotated to a parallel position on the divider for storage.

Gerber et al. in U.S. Pat. No. 5,425,546 discloses a disposable handle cover and entertainment center for a shopping cart. The handle cover and entertainment center is made of cardboard or a similar material and provides at least one amusement item and a drawing surface with a drawing instrument included with the invention.

Sowell et al. in U.S. Pat. No. 5,678,888 teaches a shopping cart child seat cover made of pliable material that is washable and soft. The seat cover is positioned over a shopping cart with fasteners that hold the cover in place. Optional features include a safety seat belt, a bottle holder, a toy holder and a cushion.

For background purposes and as indicative of the art to which the invention is related reference may be made to the remaining cited U.S. Pat. No. 6,981,707 issued to Dandy.

DISCLOSURE OF THE INVENTION

When an infant or child is placed in the seat portion of a conventional shopping cart there are problems of sanitation when a parent or guardian is shopping in a market or store. Typically, very young children have the tendency to bite on the metal rods of the shopping cart that surround their seat, and older children often touch the rails of the shopping cart which have been handled by other children previously. As such, a child can become sick or infected from being exposed to microorganisms.

A recent survey related to the problem of contamination on items that may contain bacteria left by others handling a common object, ranked shopping cart handles as number one out of six items surveyed. The bacterial content of a shopping cart handle was almost twice as high as a computer mouse used in internet cafes which ranked second. Other items included door knobs on public restrooms, hand straps on buses, elevator buttons and subway hand rails.

Therefore, the primary object of the invention is to utilize a disposable seat liner to protect both a child and a parent or guardian who are using a shopping cart from health hazards that cause the spread of disease. Since this problem is widely acknowledged there have been a variety of solutions, most of which utilize a cloth or material cover that is washable. Many of the solutions though, are complicated, bulky or expensive, and also must be carried to and from a market or store for each use. The art of protecting a child from a shopping cart seat is replete with approaches to accomplish the same end result, however none have solved the problem completely as does the instant invention by providing a disposable liner that may be used once and thrown away.

Another object of the invention is that by the use of relatively thin thermoplastic sheet material, the liner is small enough to be easily carried in a purse, bag or pocket. Multiple seat liners can be easily transported at one time, thereby permitting a user to have a seat liner available for use every time a shopping cart is utilized when a child is present.

Still another object of the invention is the seat liner's configuration, which is easy to unfold and attach to a shopping cart. It is intuitively obvious how the liner is attached to the cart, as there is a pocket formed on both the cart's handle end and seat back end which slips over the cart holding it in place securely.

Yet another object of the invention is the incorporation of a tieable restraining strap that is attached to the back of the seat liner. While most modem shopping carts with a built-in child seat have a safety strap attached to the upper bar of the seat portion, there are some shopping carts that do not contain a strap. The inventive seat liner accommodates both cases as when the cart has safety straps there are two slots in the back of the liner through which the straps may be pulled through and buckled onto the child. In the event that a shopping cart does not have safety straps, the seat liner has its own elongated strap that is formed of the same material as the liner and may be threaded through the slots and tied around the child in a knot, which could be in the form of a bow that is easily untied when small children are involved.

A further object of the invention is the fact that the seat liner itself is cost effective, particularly in the economies of numbers which is easily accomplished as the need is apparent and every parent or guardian could potentially use this invention. The seat liner is also manufactured using equipment well known in the art and readily available with a minimum of tooling, thus leading to small labor content in each article.

A final object of the invention is the fact that the seat liner is easily disposed of after use, as most markets and stores have multiple trash receptacles, thereby making it easy to simply throw the liner away. Further, when bunched up, a used seat liner takes up little space and does not create a burden during waste storage or upon removal.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a partial left angular isometric view of the disposable shopping cart child seat liner in the preferred embodiment.

FIG. 4 is a cross-sectional view taken along lines 4-4 of FIG. 3.

FIG. 5 is a cross-sectional view taken along lines 5-5 of FIG. 3.

FIG. 6 is a partial isometric view of the single-thickness tieable restraining strap completely removed from the invention for clarity.

FIG. 7 is a partial isometric view of the double-thickness tieable restraining strap completely removed from the invention for clarity.

FIG. 8 is a cross-sectional view taken along lines 8-8 of FIG. 3.

FIG. 9 is a rear view of the preferred embodiment illustrating the tieable restraining strap attached to the outer surface of the seat back portion of the liner.

BEST MODE FOR CARRYING OUT THE INVENTION

Figure 1:
FIG. 1 is a partial isometric view of a shopping cart with the disposable shopping cart child seat liner installed.

The best mode for carrying out the invention is presented in terms of a preferred embodiment for a disposable shopping cart child seat liner 10 that is used to cover both a shopping cart's child seat 20 and handle 22. The preferred embodiment, as shown in FIGS. 1 through 12, is comprised of a liner seat bottom 24 that is configured to cover a child's seating area of a shopping cart 26. The liner seat bottom 24 has the same size configuration as the cart's child seat 20 when the shopping cart 26 has its seat platform hinged open to a horizontal position. The entire liner 10 is formed from a material consisting preferably of a thermoplastic polyurethane film having a thickness ranging from 1.0 to 4.0 mils, thereby allowing the liner 10 to be light in weight, small when folded and disposable. The thickness is dependent upon the age of the child. Older children require a thicker material since they are more active and the strength of material becomes an important consideration.

Figure 2:
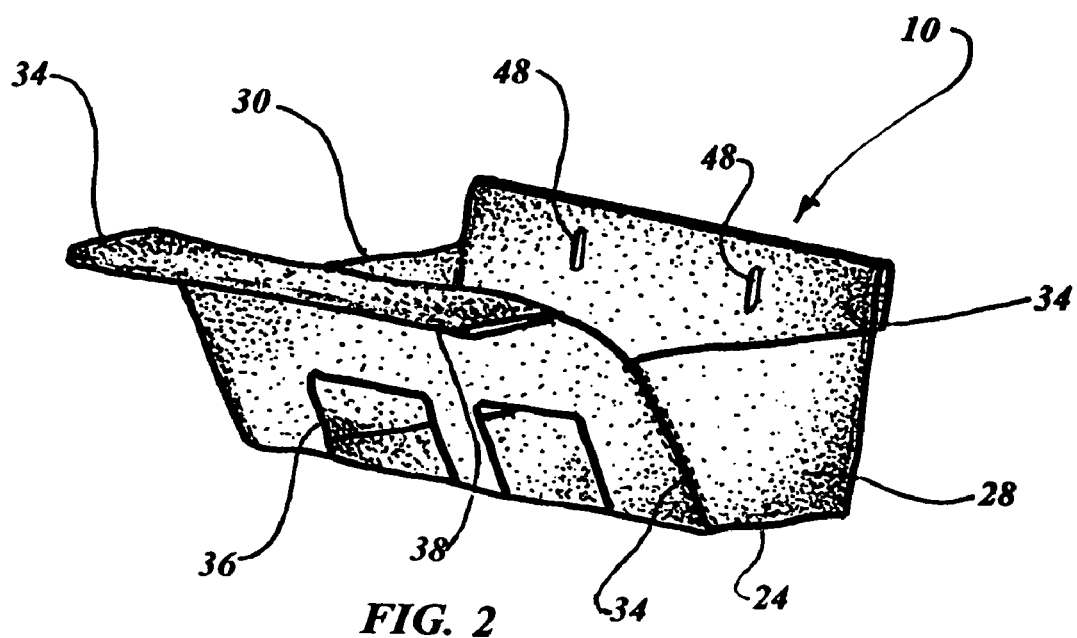
FIG. 2 is a partial right angular isometric view of the disposable shopping cart child seat liner in the preferred embodiment.
Figure 12:
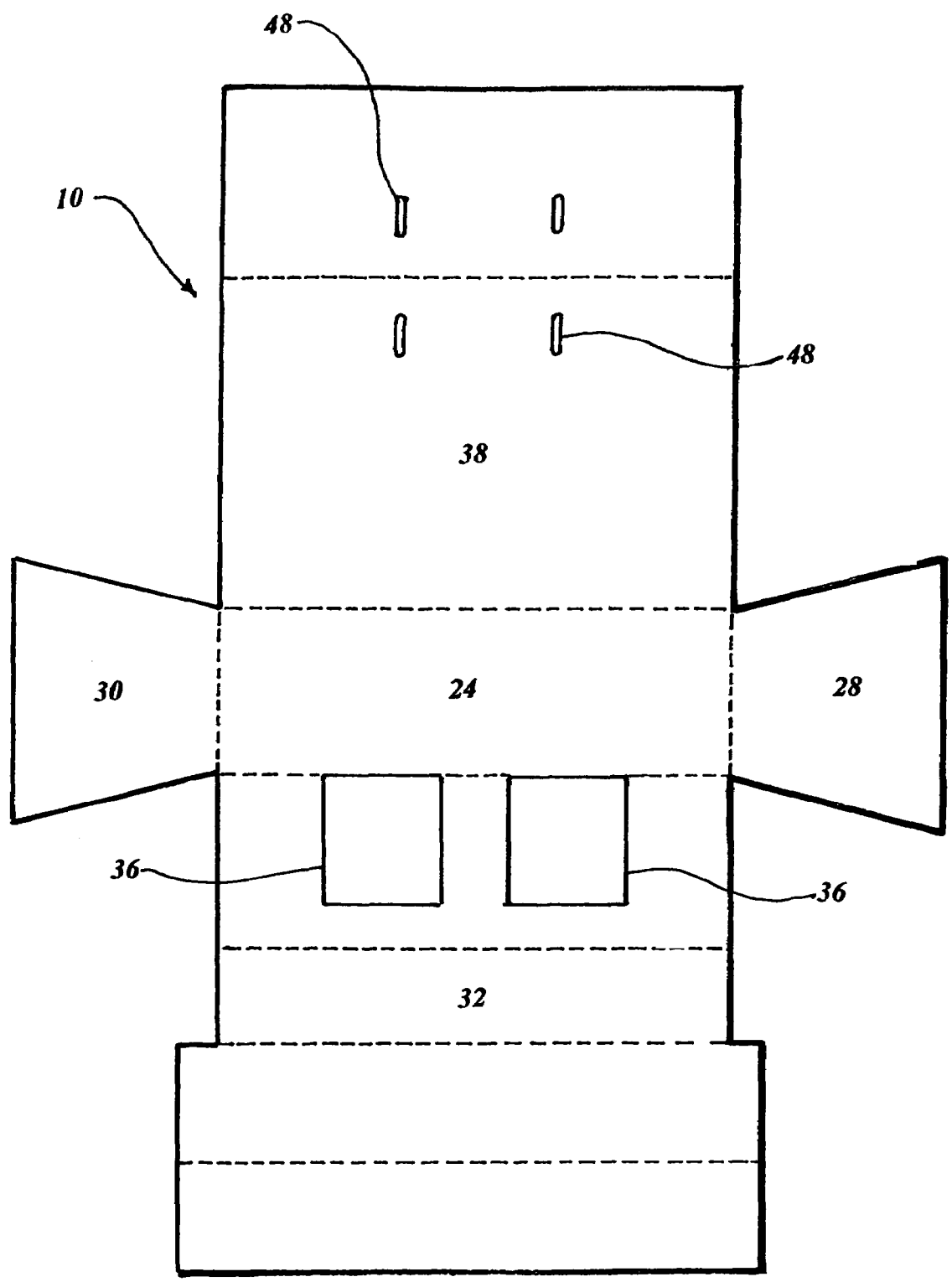
FIG. 12 is elevational plan view of the disposable shopping cart child seat liner in the flat prior to heat sealing the edges together, forming the completed liner.

A liner right side 28 and a liner left side 30 are integrally formed with the seat bottom 24 and folded upward therefrom, as shown in FIGS. 2, 3 and 12. The liner right side 28 and liner left side 30 have a greater height than the sides of a shopping cart's child seat 20, which permits the liner right side 28 and liner left side 30 to be lapped over the cart's seat by a child, thereby preventing the child from coming in direct-contact with the shopping cart 26.

A liner handle end 32 overlaps the cart handle 22 and is integrally formed with the seat bottom 24. The liner handle end 32 is folded at an acute angle upward therefrom, and is permanently attached to both the liner right side 28 and the liner left side 30 on adjacent edges with a heat-sealed joint 34. The liner handle end 32 has a width greater than a shopping cart's child seat 20 to accommodate the width of the cart handle 22, as shown best in FIG. 12. The liner handle end 32 includes two leg cutouts 36 that are in alignment with openings in the shopping cart 26 for accommodating a child's legs. A handle end pocket 38 is formed by overlapping the liner handle end 32 into a U-shape and attaching each contiguous lateral distal edge with a heat-sealed joint 34, thus leaving a longitudinal mating surface 40 open to receive and retain the shopping cart's handle 22.

Figure 10:
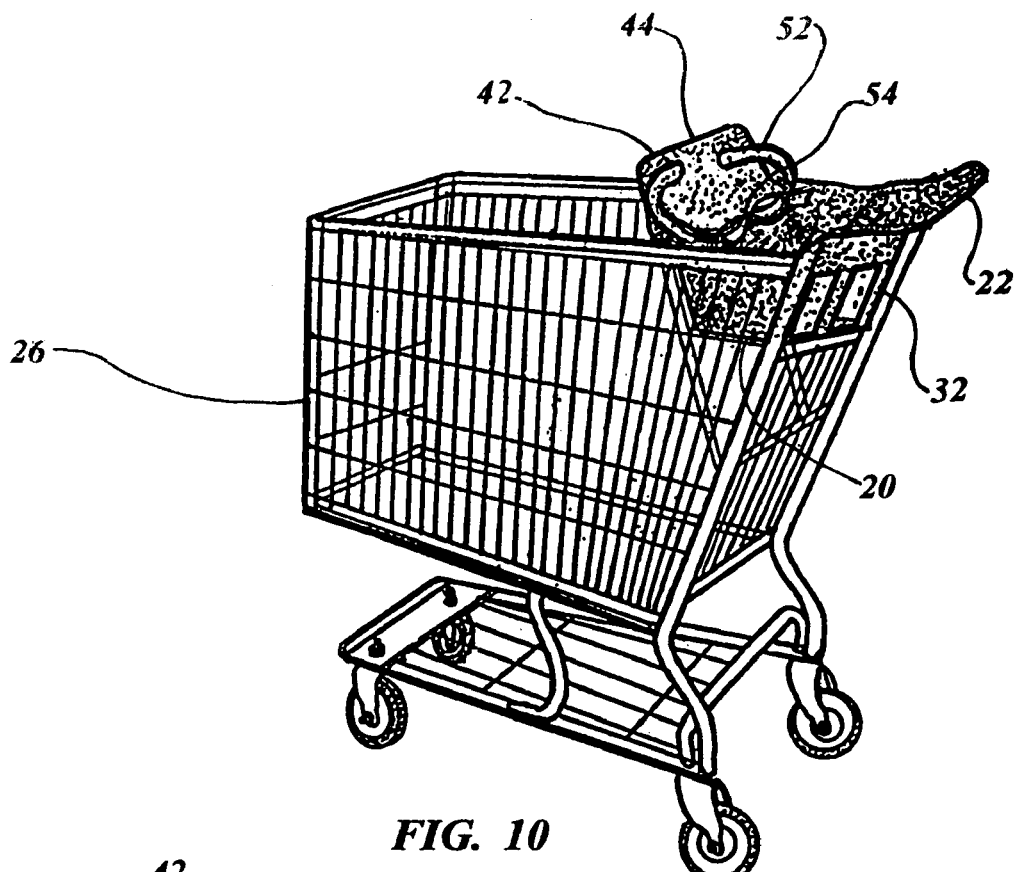
FIG. 10 is a partial isometric view of the shopping cart with the liner installed and the cart's safety strap inserted through the slots in the back portion of the liner and snapped together.
Figure 11:
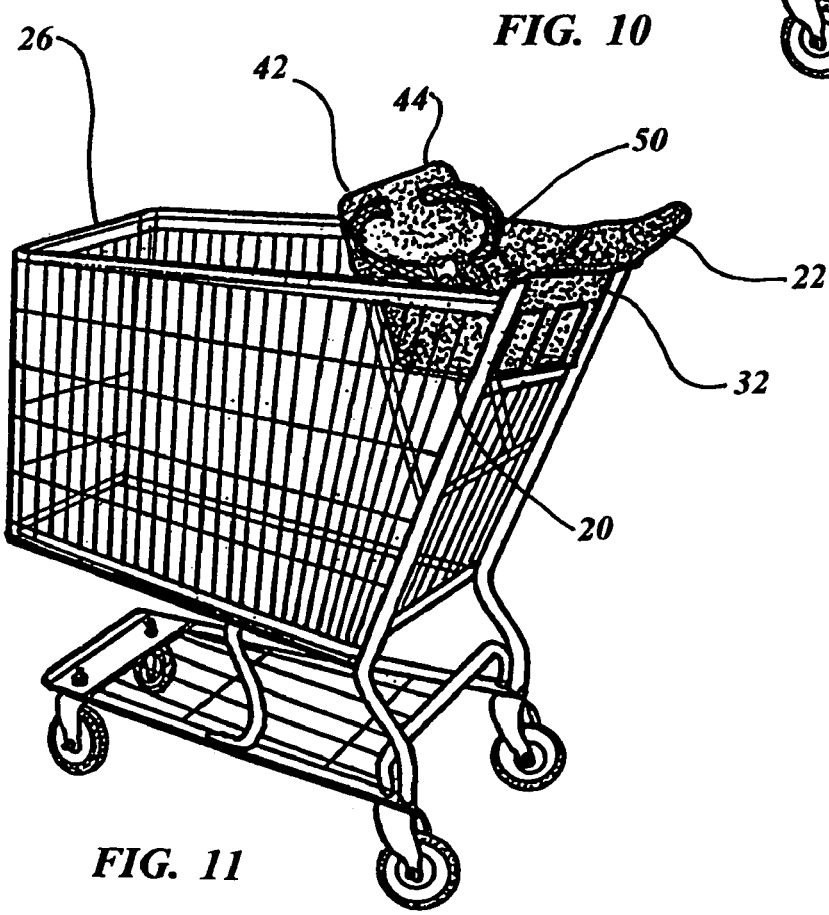
FIG. 11 is a partial isometric view of the shopping cart with the liner installed and the liner's restraining strap inserted through the slots in the back portion of the liner and tied together in a knot in the form of a bow.

A liner seat back 42 jointly overlaps the cart's seat 20 and cart's basket upper portion 44, and is folded at an acute angle upward from the liner seat bottom 24. The liner seat back 42 is permanently attached to the liner right side 28 and liner left side 30 on adjacent edges, with a heat-sealed joint 34 forming the disposable shopping cart child seat liner 10, thereby assuring isolation from microorganisms found on the shopping cart's child seat 20 and cart's handle 22. A seat back pocket 46 is formed by overlapping the liner seat back 42 into a U-shape, as illustrated in FIG. 5, and is attached with a heat-sealed joint 34 on contiguous lateral distal edges, thus leaving a longitudinal mating surface 40 open to receive and retain the shopping cart's child seat back 42. A pair of mating slots 48 are formed through the liner seat back 42 for accommodating safety straps 50. If the shopping cart 26 includes fabric safety straps 50, as illustrated in FIG. 10, the ends of the strap 50 may be inserted through the slots 48 and buckled around the child. However, if the shopping cart does not include straps 50, a tieable restraining strap 52 is attached to an outer surface of the seat back 42 on a side opposite the child's seat 20. The tieable restraining strap 52 is aligned between the slots 48, thereby permitting each distal end of the restraining strap 52 to be inserted into an adjoining slot 48 for retaining the child by tying the restraining strap 52 around the child's waist in a knot 54 such as a bow, as shown in FIG. 11.

The tieable restraining strap 52 is attached to an outer surface of the seat back 42 on a side opposite the child seat 20 using a heat-sealed joint 34. The restraining strap may be a single thickness 56 of liner material that is formed into an elongated strap, as shown in FIG. 6, or a double thickness 58 of liner material, as illustrated in FIG. 7, that is formed into an elongated strap using a heat-sealed joint 34 along the longitudinal edge.

During use, the seat liner 10 is unfolded and placed into the child seat 20 of the shopping cart 26, with the handle end pocket 38 placed over the cart handle 22, and the seat back pocket 46 stretched over the seat back upper portion 44. The child is then placed in the seat 20 and is protected from touching the cart 26 in all directions. If the cart 26 has safety straps 50 they may be used, or if the cart does not have safety straps, the integral restraining straps 52 may be tied around the child. When shopping is completed, the child and the seat liner 10 may be removed from the shopping cart 26 and the liner 10 disposed of in a convenient trash receptacle.

While the invention has been described in detail and pictorially shown in the accompanying drawings, it is not to be limited to such details, since many changes and modifications may be made to the invention without departing from the spirit and scope thereof. For example, the disposable liner could also be produced from paper and be configured to fit over a wheel chair, a restaurant child's highchair, publicly-used chairs and baby strollers. Hence, it is described to cover any and all modifications and forms which may come within the language and scope of the appended claims.

The invention claimed is:

1. A disposable seat liner in combination with a shopping cart having a child seat and a cart handle which comprises:
   a) a liner seat bottom that is configured to cover a child's seating area of a shopping cart,
   b) a liner right side and a liner left side that are integrally formed with the seat bottom and folded upward therefrom,
   c) a liner handle end formed with the seat bottom and folded at an acute angle upward therefrom, wherein said liner handle end is permanently attached to said liner right side and said liner left side on adjacent edges, wherein said liner handle end further comprises a handle end pocket that is formed by overlapping the liner handle end into a U-shape and heat-sealing each contiguous lateral distal edge, thus leaving a longitudinal mating surface open to receive and retain the shopping cart's handle, and
   d) a liner seat back folded at an acute angle upward therefrom, wherein said liner seat back is permanently attached to said liner right side and said liner left side on adjacent edges, thereby forming a disposable protective cover to assure isolation from microorganisms found on the shopping cart's child seat and handle.

2. The disposable seat liner as recited in claim 1 wherein said liner further comprises a material consisting of a thermoplastic polyurethane film having a thickness ranging from 1.0 to 4.0 mils.

3. The disposable seat liner as recited in claim 2 further comprising a heat-sealed joint that attaches the liner's right side and liner left side to the liner handle end, and also attaching the liner right side and liner left side to the liner seat back.

4. The disposable seat liner as recited in claim 1 wherein said liner seat bottom is configured for duplicating in mirror image the cart's child seat when the shopping cart has a seat platform hinged horizontally to an open position.

5. The disposable seat liner as recited in claim 1 wherein said liner right side and liner left side is configured to have a greater height than sides of the shopping cart's child seat, which permits the liner right side and the liner left side to be lapped over the cart's seat by a child, thereby preventing the child from coming in direct contact with the shopping cart.

6. The disposable seat liner as recited in claim 1 wherein said liner handle end is configured to have a width greater that the shopping cart's child seat to accommodate the handle width.

7. The disposable seat liner as recited in claim 1 wherein said liner handle end is configured to have two leg cutouts in alignment with openings in the shopping cart for accommodating a child's legs.

8. The disposable seat liner as recited in claim 1 wherein said liner seat back further comprises a seat back pocket that is formed by overlapping the liner seat back into a U-shape and heat-sealing each contiguous lateral distal edge, thus leaving a longitudinal mating surface open to receive and retain the shopping cart's child seat back.

9. The disposable seat liner as recited in claim 1 wherein said liner seat back further having a pair of slots that are formed through the liner seat back for accommodating safety straps.

10. The disposable seat liner as recited in claim 9 wherein said liner seat back further comprises a tieable restraining strap that is attached to an outer surface of the seat back on a side opposite the child's seat, with the strap aligned between the slots, thereby permitting each distal end of the restraining strap to be inserted into an adjoining slot for retaining a child by tying the tieable restraining strap around the child's waist in a knot defined as a bow.

11. The disposable seat liner as recited in claim 10 wherein said tieable restraining strap that is attached to an outer surface of the seat back on a side opposite the child's seat is attached by heat-sealing.

12. The disposable seat liner as recited in claim 10 wherein said tieable restraining strap further comprises a single thickness of liner material that is formed into an elongated strap.

13. The disposable seat liner as recited in claim 10 wherein said tieable restraining strap further comprises a double thickness sealed strip of liner material that is formed into an elongated strap.

* * * * *